United States Patent [19]

Grice et al.

[11] 4,157,590

[45] Jun. 5, 1979

[54] PROGRAMMABLE LOGIC ARRAY ADDER

[75] Inventors: Donald G. Grice, Kingston; David F. Johnson, Saugerties; Arnold Weinberger, Poughkeepsie, all of N.Y.

[73] Assignee: International Business Machines Corporation, Armonk, N.Y.

[21] Appl. No.: 866,689

[22] Filed: Jan. 3, 1978

[51] Int. Cl.² .............................................. G06F 7/50
[52] U.S. Cl. ................................................. 364/787
[58] Field of Search .............................. 364/787, 716

[56] References Cited

U.S. PATENT DOCUMENTS

| | | | |
|---|---|---|---|
| 3,925,652 | 12/1975 | Miller | 364/787 |
| 3,983,538 | 9/1976 | Jones | 364/716 |
| 3,987,287 | 10/1976 | Cox et al. | 364/716 X |
| 3,993,891 | 11/1976 | Beck et al. | 364/787 |

OTHER PUBLICATIONS

Brickman et al., "Programmable Logic Array One-Cycle Split Adder", *IBM Tech. Discl. Bulletin,* vol. 17, No. 12, May 1975, pp. 3653-3655.

*Primary Examiner*—David H. Malzahn
*Attorney, Agent, or Firm*—Karl O. Hesse

[57] ABSTRACT

This specification discloses a multi digit binary adder embodied in programmable logic arrays (PLAs). The particular programmable logic array used here has a separate two bit decoder for receiving each like order pairs of digits $A_i$, $B_i$ of two n digit binary numbers $A_0$, $A_1....A_{n-1}$ and $B_0$, $B_1....B_{n-1}$ plus a carry $C_{in}$. The decoders generate an output signal called a min term on a different line for each of the four possible combinations $A_iB_i$, $A_i\bar{B}_i$, $\bar{A}_iB_i$ and $\bar{A}_i\bar{B}_i$ of the true and complement of each pair. The min terms from the decoders are fed to an array called the product term generator or AND array which generates product terms $$f_p = f_0(A_0,B_0) f_1(A_1,B_1)...f_{n-1}(A_{n-1}, B_{n-1}) f_n(C_{in})$$

The product terms are fed to a second array called a sum of product term generator or OR array that sums product terms $f_p$. A series of latches is last in the sequence of logic elements making up the PLA. These latches each perform an AND function to generate a sum bit $S_i$ that is an AND of two functions supplied by the OR array to the inputs of the latches to generate a sum $S_0$, $S_1....S_{n-1}$ plus a carry $C_{out}$ for the adder at the output of the PLA. The adder is optimized for a PLA with latches that perform an AND function.

10 Claims, 3 Drawing Figures

FIG. 1

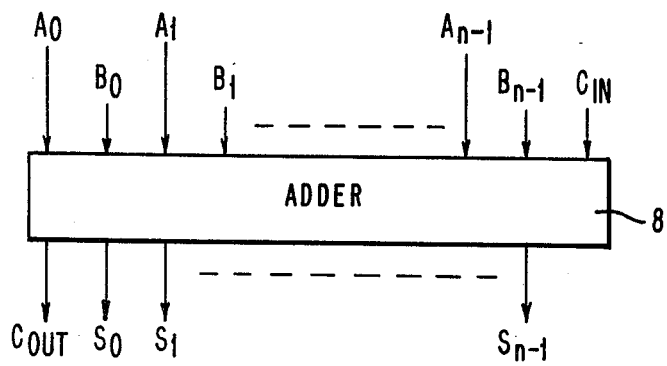

$(A_0, \ldots, A_{n-1})$ = ADDEND
$(B_0, \ldots, B_{n-1})$ = AUGEND  } OF n BIT ADDER WHERE
$(S_0, \ldots, S_{n-1})$ = SUM        $0, \ldots, n-1$ = HIGH TO LOW ORDER
C IN = INPUT CARRY
C OUT = OUTPUT CARRY = $C_0$

FIG. 3

| $\overline{A_i} \cdot \overline{B_i}$ | $\overline{A_i} \cdot B_i$ | $A_i \cdot \overline{B_i}$ | $A_i \cdot B_i$ | |
|---|---|---|---|---|
| 0 | 0 | 0 | 0 | $\overline{A_i} \cdot \overline{B_i} + \overline{A_i} \cdot B_i + A_i \cdot \overline{B_i} + A_i \cdot B_i = 1$ = DON'T CARE |
| 0 | 0 | 0 | 1 | $\overline{A_i} \cdot \overline{B_i} + \overline{A_i} \cdot B_i + A_i \cdot \overline{B_i}\quad = \overline{A_i} + \overline{B_i} = \overline{G_i}$ |
| 0 | 0 | 1 | 0 | $\overline{A_i} \cdot \overline{B_i} + \overline{A_i} \cdot B_i \quad + A_i \cdot B_i = \overline{A_i} + B_i$ |
| 0 | 0 | 1 | 1 | $\overline{A_i} \cdot \overline{B_i} + \overline{A_i} \cdot B_i \quad = \overline{A_i}$ |
| 0 | 1 | 0 | 0 | $\overline{A_i} \cdot \overline{B_i} \quad + A_i \cdot \overline{B_i} + A_i \cdot B_i = A_i + \overline{B_i}$ |
| 0 | 1 | 0 | 1 | $\overline{A_i} \cdot \overline{B_i} \quad + A_i \cdot \overline{B_i} \quad = \overline{B_i}$ |
| 0 | 1 | 1 | 0 | $\overline{A_i} \cdot \overline{B_i} \quad + A_i \cdot B_i = \overline{A_i \veebar B_i} = \overline{H_i}$ |
| 0 | 1 | 1 | 1 | $\overline{A_i} \cdot \overline{B_i} \quad = \overline{A_i} \cdot \overline{B_i} = \overline{P_i}$ |
| 1 | 0 | 0 | 0 | $\overline{A_i} \cdot B_i + A_i \cdot \overline{B_i} + A_i \cdot B_i = A_i + B_i = P_i$ |
| 1 | 0 | 0 | 1 | $\overline{A_i} \cdot B_i + A_i \cdot \overline{B_i} \quad = A_i \veebar B_i = H_i$ |
| 1 | 0 | 1 | 0 | $\overline{A_i} \cdot B_i \quad + A_i \cdot B_i = B_i$ |
| 1 | 0 | 1 | 1 | $\overline{A_i} \cdot B_i \quad = \overline{A_i} \cdot B_i$ |
| 1 | 1 | 0 | 0 | $A_i \cdot \overline{B_i} + A_i \cdot B_i = A_i$ |
| 1 | 1 | 0 | 1 | $A_i \cdot \overline{B_i} \quad = A_i \cdot \overline{B_i}$ |
| 1 | 1 | 1 | 0 | $A_i \cdot B_i = A_i \cdot B_i = G_i$ |
| 1 | 1 | 1 | 1 | $= 0 \qquad =$ FALSE |

PROGRAMMABLE LOGIC ARRAY ADDER of two numbers, $S_1, S_2 \ldots S_n$ as the output of one of the latches of the PLA in accordance with either of the following two formulas:

$$S_i = \begin{bmatrix} \overline{H}_i \cdot G_{i+1}^{i+j} \\ +H_i \cdot (\overline{G}_{i+1}^{i+j} \cdot \overline{H}_{i+1}^{i+j}) \\ +H_i \cdot H_{i+1}^{i+j} \\ +C_{i+j+1} \end{bmatrix} \cdot \begin{bmatrix} \overline{H}_i \cdot G_{i+1}^{i+j} \\ +\underline{H}_i \cdot (\overline{G}_{i+1}^{i+j} \cdot \overline{H}_{i+1}^{i+j}) \\ +\underline{H}_i \cdot H_{i+1}^{i+j} \\ +C_{i+1} \end{bmatrix}$$

$$\overline{S}_i = \begin{bmatrix} \overline{H}_i \cdot (\overline{G}_{i+1}^{i+j} \cdot \overline{H}_{i+1}^{i+j}) \\ +H_i \cdot G_{i+1}^{i+j} \\ +\underline{H}_i \cdot H_{i+1}^{i+j} \\ +\overline{C}_{i+j+1} \end{bmatrix} \cdot \begin{bmatrix} \overline{H}_i \cdot (\overline{G}_{i+1}^{i+j} \cdot \overline{H}_{i+1}^{i+j}) \\ +H_i \cdot G_{i+1}^{i+j} \\ +\underline{H}_i \cdot H_{i+1}^{i+j} \\ +\overline{C}_{i hd\ i+j+1} \end{bmatrix}$$

Where:

$$G_{i+1}^{i+j} = G_{i+1} \\ + H_{i+1} \cdot G_{i+2} \\ \vdots \\ + H_{i+1} \ldots \cdot H_{i+j-1} \cdot G_{i+j}$$

$$(\overline{G}_{i+1}^{i+j} \cdot \overline{H}_{i+1}^{i+j}) = \overline{P}_{i+1} \\ + H_{i+1} \cdot \overline{P}_{i+2;sd,21} \\ \vdots \\ + H_{i+1} \ldots \cdot H_{i+j-1} \overline{P}_{i+j}$$

$H_{i+1}^{i+j} = H_{i+1} \ldots \cdot H_{i+j}$
$G_{i+1}^{i+j}$ = cary - generate condition for bit group $i+1$ through $i+j$.
$H_{i+1}^{i+j}$ = carry - propagate condition for bit group $i+1$ through $i+j$.
$G_i = A_i \cdot B_i \quad G_i = A_i + B_i$
$P_i = A_i + B_i \quad \overline{P}_i = \overline{A}_i \cdot \overline{B}_i$ $H_i = A_i \mathsf{V} B_i \quad \overline{H}_i = \overline{A_i \mathsf{V} B_i} = \overline{A}_i \mathsf{V} B_i = A_i \mathsf{V} \overline{B}_i$

BACKGROUND OF THE INVENTION

The present invention relates to adders and more particularly relates to adders which are embodied in programmable logic arrays.

The performing of logic in an array of identical circuit elements each located at a unique intersection of an input and output line in a grid of intersecting input and output lines is well known. There are many such arrangements of arrays for performing logic. One of them is called a programmable logic array (PLA). An example of one type of PLA can be seen in Cox, et al. U.S. Pat. No. 3,987,287. In this PLA input decoders generate min terms and feed them into a first array called a product term generator or an AND array to generate product terms which are functions of the inputs to the decoders. These product terms are fed to a second array called a sum of product term or OR array so as to increase the number of functions that can be performed using these product terms without geometrically increasing the size of the AND array needed to perform these functions. The output of the OR array is fed to latches so that both sequential and combinatorial logic can be performed using this PLA.

Logical functions have been performed by these latches in the prior art. For example, in certain PLAs the latches perform an Ex-OR function. Pages 3635 to 3655 of the May 1975 issue of the *IBM Technical Disclosure Bulletin* describe an adder which is embodied in PLAs of this type.

THE INVENTION

In accordance with the present invention a new carry lookahead adder is provided using programmable logic arrays with output latches that perform an AND function. This adder is more efficient than presently known adders embodying feedback through to the AND/OR arrays. This adder has means for feeding every like order set of digits $A_iB_i$ of two multi digit numbers $A_0, A_1, \ldots A_{n-1}$ and $B_0, B_1 \ldots B_{n-1}$ into a separate two bit decoder of a PLA and including circuit means in the product term and sum of product term generating arrays to generate any order sum digit $S_i$ of a binary sum Other improvements are in the generating of the carry out digit, in the replacement of individual product terms each with a sum of available product terms, and in the arrangement of the strings of sum digits to produce the most efficient use of product terms. Therefore it is an object of the present invention to generate a new adder for embodiment in programmable logic array structures.

It is another object of the invention to generate a new adder for use in a programmable logic array structure that has latches that perform an AND function.

It is a further object of the invention to provide an array logic adder which requires less product terms than known array logic adders using latches that perform an ADD function.

THE DRAWINGS

These and other objects of the invention will be apparent from the particular description of the preferred embodiment of the invention of which:

FIG. 1 is a schematic representation of an adder;

FIG. 3 is a table showing logical functions that can be performed in the AND array of a programmable logic array being fed by two bit decoders.

EMBODIMENT OF THE INVENTION

FIG. 1 shows two n-bit numbers $A_0A_1 \ldots A_{n-1}$ and $B_0B_1 \ldots B_{n-1}$ being added together with an input carry $C_{in}$, by circuitry to produce an n-bit sum $S_0S_1 \ldots S_{n-1}$ and an output carry $C_{out}$. The circuitry 8 performing the adder function is in the form of programmable logic arrays (PLAs) shown schematically in FIG. 2.

Figure 2B:
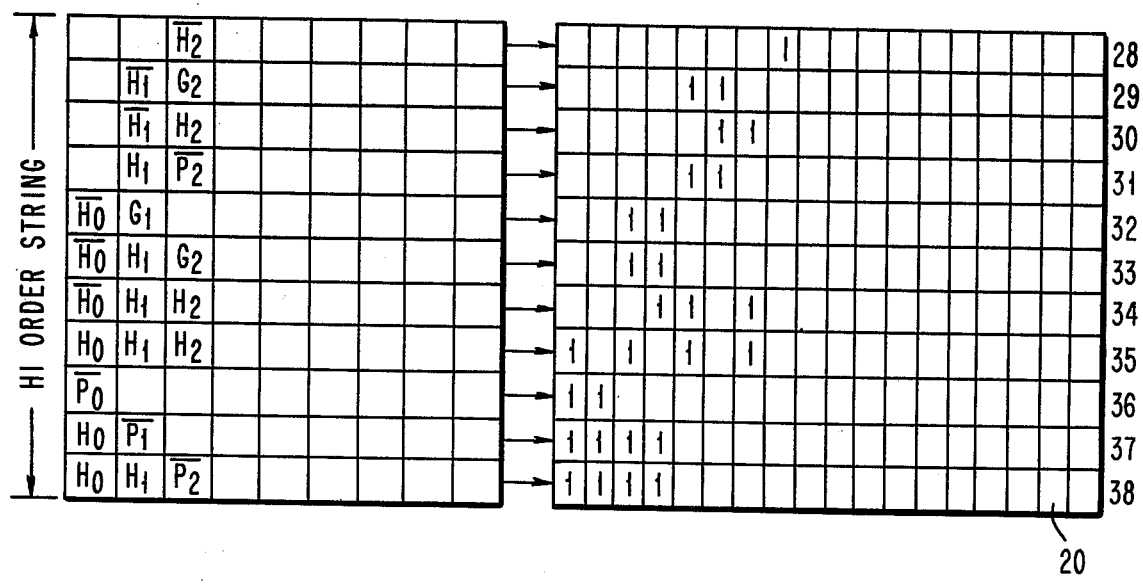
FIGS. 2A and 2B are to be placed together to show an adder in accordance with the present invention.
Figure 2:
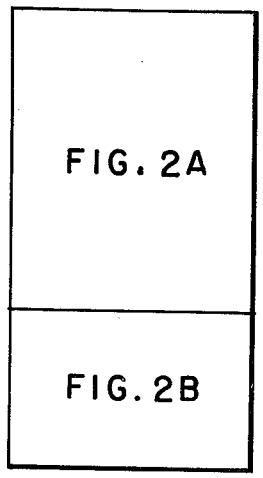
FIG. 2 is a diagram showing how
Figure 2A:
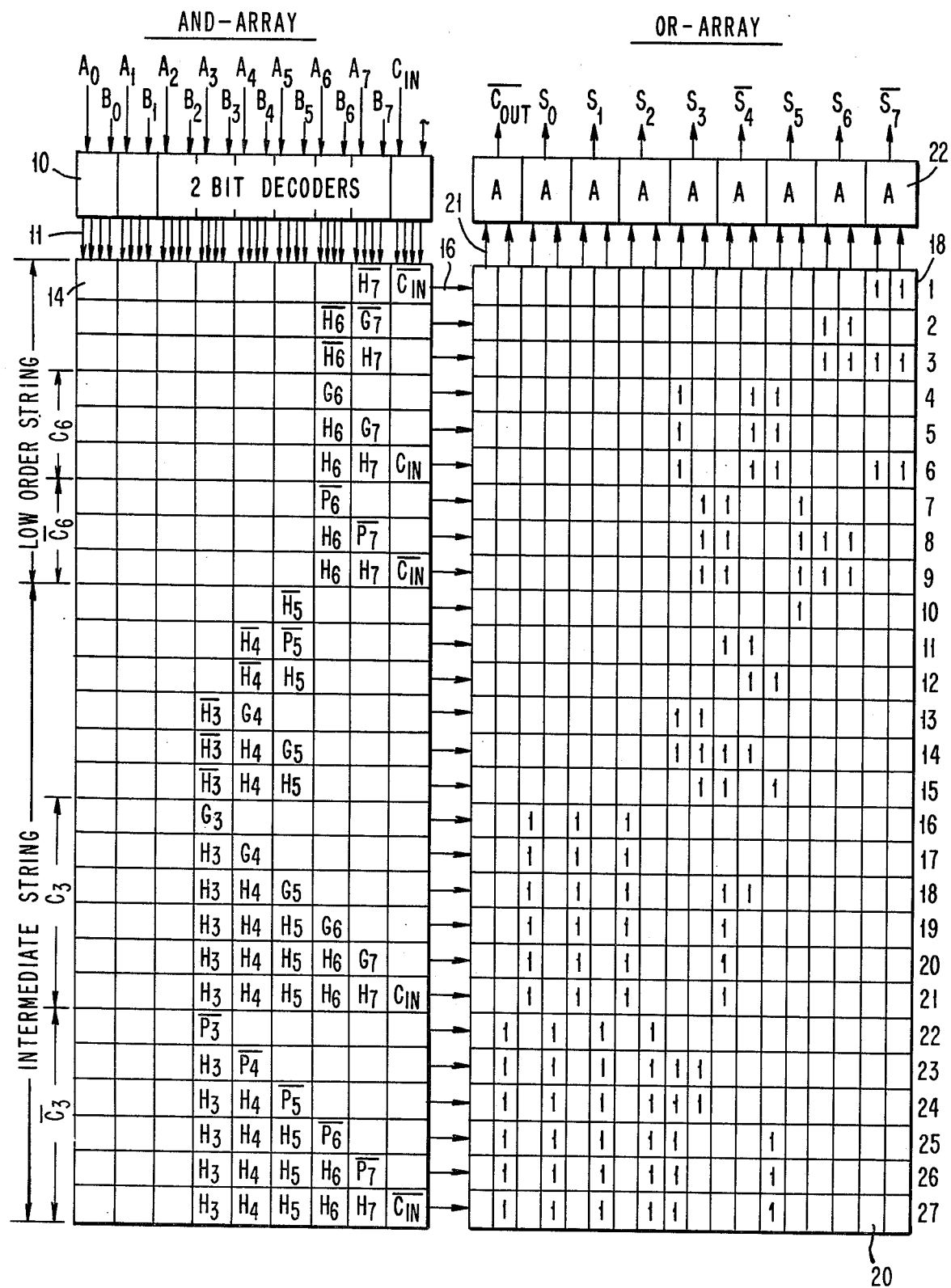

In FIG. 2 corresponding bits of two 8-bit numbers $A_0, A_1 \ldots A_7$ and $B_0, B_1 \ldots B_7$ are fed in pairs to 2-bit decoders 10. The decoders 10 each generate a pulse on a different one of four output lines for each of the four possible combinations of the true and complement of the input bits $A_i$ and $B_i$ supplied to them. Each output line of any decoder 10 is connected to a separate input line 11 of an AND array 12. The blocks 14 in FIG. 2 represent the intersection of each set of four input lines 11 from one decoder 10 with an output line 16. Within each block 14 there are four possible NOR gate connections. These NOR gates are used to connect any of the input lines 11 of the set to the output line 16 passing through the block 14. Selective connection of the input lines to the output line allows one of 16 different logical functions to be performed in any block on the two inputs $A_i$ and $B_i$ to one of the decoders 10 and placed on that output line by the combination of the decoders and the NOR gates within one of the blocks 14.

The different logical functions are shown in the table of FIG. 3. In the table, each of the four columns represents one of the input lines in a four input line set 11 of the AND array. The heading on the columns indicates the combination of true and/or complements of the inputs $A_i$ and $B_i$ fed to the decoder 10 connected to that set of input lines which produces a pulse on the input line represented by the column. The legend on the sixteen rows of the table are all the possible functions that can be performed in the two inputs $A_i$ and $B_i$ to the decoder. The squares formed by the intersection of a row and column each represent an intersection between the input line represented by the column and the output line passing through the block. The number 1 in any square indicates there must be a connection between the input line and the output line at that intersection to generate the function indicated by the legend for that row while the number 0 in the box indicates that there must be no connection to generate that function. Of the 16 possible functions only 6 are of interest in the performance of addition in accordance with the present invention. These are marked $G_i$, $\overline{G}_i$, $P_i$, $\overline{P}_i$, $H_i$ and $\overline{H}_i$ in FIG. 3. Performing logic operations using arrays and 2-bit decoders in this manner is well known and can be found in Cox, et al. U.S. Pat. No. 3,987,287, issued Oct. 19, 1976.

Now referring solely to FIG. 2, the row of the AND array represents a product term. For example, row 5 in FIG. 2 contains the product term $H_6 G_7$, where $H_6$ is a function of the inputs $(A_6, B_6)$ and $G_7$ is a function of $(A_7, B_7)$. A blank in any box 14 represents a "don't care" condition in the generation of the product term. The output line 16 for each row of the AND array is connected to an input line of an OR array 18. Each box 20 in the OR array represents the intersection of one of the input lines of the OR array with one of the output lines 21 of the OR array. A one in any one box indicates a connection in the form of a NOR circuit between the input line and the output line at that intersection. An empty box 20 means there is no connection between the intersection of input and output lines represented by that particular box. Thus, each column of boxes 20 in the OR array 10 represents the OR of sum of the product terms in the AND array connected to the output line 21 by the NOR circuits as denoted by the 1s in the boxes of the column. For example, the left-most column of the OR array represents the OR of the product terms shown in rows 35 through 38.

Pairs of adjacent OR columns are ANDED into polarity-hold latches 22. The outputs of the AND circuits 22 are the outputs of the PLAs and the outputs of the adder. Thus, the output $\overline{C_{out}}$ is the AND of the two left-most OR columns.

With this type of PLA, an adder design will now be developed, so that each output represents an AND of two functions, each function representing an OR of product terms. A product term will be an AND of functions of the individual bit position inputs to the adder, and the input carry.

$$\text{Product term} = f_0(A0, B0) \cdot f_1(A1, B1) \cdot \ldots \cdot f_{n-1}(A_{n-1}, B_{n-1}) \cdot f_n(C_{in}) \tag{1}$$

The functions performed on corresponding bits $A_i$ and $B_i$ of the n bit inputs to the adder by the decoders 10 and the NOR circuits in one of the boxes 14 in the AND array are:

$$\begin{aligned} G_i &= A_i \cdot B_i & \overline{G}_i &= \overline{A}_i + \overline{B}_i \\ P_i A_i &+ B_i & \overline{P}_i &= \overline{A}_i \cdot \overline{B}_i \\ H_i &= A_i \vee B_i & \overline{H}_i &= \overline{A_i \vee B_i} = \overline{A}_i \vee B_i = A_i \vee \overline{B}_i \end{aligned} \tag{2}$$

Referring to equations (2), $G_i$ means both bits $A_i$ AND $B_i$ are on, and $H_i$ means one of bits $A_i$ and $B_i$ is on and the other is off. It will be appreciated that a carry $C_i$ out of a sum bit position i will occur if $A_i$ AND $B_i$ are on OR will occur if one of bits $A_i$ and $B_i$ is on and the other is off AND a carry in is received. This can also be expressed as $C_i = G_i + H_i \cdot G_{i+1}$. From equations (2) $P_i$ means bits $A_i$ OR $B_i$ are on. Although some redundancy is introduced, a carry $C_i$ out of a sum bit position i will occur if $A_i$ AND $B_i$ are on OR will occur if either $A_i$ OR $B_i$ (or both) are on AND a carry in is received. This alternate carry expression is simpler from a logic implementation point of view and can be more compactly stated as $C_i = G_i + P_i \cdot G_{i+1}$. Thus in situations where sharing of product terms does not proscribe redundancy, an equivalent order P term can be substituted for any of the H terms of the following equation (3).

By noting that while not carry $\overline{C}_i = \overline{P}_i + H_i \cdot \overline{P}_{i+1}$ it also is true that $\overline{C}_i = \overline{P}_i + \overline{G}_i \cdot \overline{P}_{i+1}$ and therefore similar redundancy can be advantageously but selectively introduced into equation (4).

Using known carry-look ahead methods, any carry and its complement can be expressed as:

$$\begin{aligned} C_i =\ & G_i \\ & + H_i \cdot G_{i+1} \\ & \cdot \\ & \cdot \\ & + H_i \cdot H_{i+1} \cdot \ldots \cdot H_{n-2} \cdot G_{n-1} \\ & \pm H_i \cdot H_{i+1} \cdot \ldots \cdot H_{n-2} \cdot H_{n-1} \cdot C_{in} \end{aligned} \tag{3}$$

$$\begin{aligned} \overline{C}_i =\ & \overline{P}_i \\ & + H_i \cdot \overline{P}_{i+1} \\ & \cdot \\ & \cdot \\ & + H_i \cdot H_{i+1} \cdot \ldots \cdot H_{n-2} \cdot \overline{P}_{n-1} \\ & + H_i \cdot H_{i+1} \cdot \ldots \cdot H_{n-2} \cdot H_{n-1} \cdot \overline{C}_{in} \end{aligned} \tag{4}$$

A sum bit can be expressed as a function of the preceding carry, expanded to a function of some distant carry, and then converted to an AND of two OR functions. One OR function includes the distant carry as one OR term, while the other OR function includes the complement of the distant carry as one OR term.

$$\begin{aligned} S_i &= H_i \cdot \overline{C}_{i+1} + \overline{H}_i C_{i+1} \\ &= H_i \cdot (\overline{G}_{i+1}^{+j} \cdot \overline{H}_{i+1}^{+j}) + \overline{H}_i \cdot G_{i+1}^{+j} \end{aligned} \tag{5}$$

-continued $$+ H_i \cdot H_{i+1}^{i+j} \cdot C_{i+j+1} + \bar{H}_i \cdot H_{i+1}^{i+j} \cdot C_{i+j+1}$$

$$= \bar{H}_i \cdot G_{i+1}^{i+j} \qquad \bar{H}_i \cdot G_{i+1}^{i+j}$$

$$+ H_i \cdot (\overline{G_{i+1}^{i+j} \cdot H_{i+1}^{i+j}}) \quad H_i \cdot (\overline{G_{i+1}^{i+j} \cdot H_{i+1}^{i+j}}) \tag{6}$$

$$+ H_i \cdot H_{i+1}^{i+j} \qquad + \bar{H}_i \cdot H_{i+1}^{i+j}$$

$$+ C_{i+j+1} \qquad + \bar{C}_{i+j+1}$$

Where:

$$G_{i+1}^{i+j} = G_{i+1} \qquad \bar{G}_{i+1}^{i+j} \cdot \bar{H}_{i+1}^{i+j} = \bar{P}_{i+1}$$

$$+ H_{i+1} \cdot G_{i+2} \qquad + H_{i+1} \cdot P_{i+2} \tag{7}$$

$$\vdots \qquad \vdots$$

$$+ H_{i+1} \cdot \ldots \cdot H_{i+j-1} \cdot G_{i+j} \qquad + H_{i+1} \cdot \ldots \cdot H_{i+j-1} \cdot P_{i+j}$$

$$H_{i+1}^{i+j} = H_{i+1} \cdot \ldots \cdot H_{i+j} \tag{8}$$

Expanded, $S_i$ becomes:

$$S_i = \begin{bmatrix} \bar{H}_i \cdot G_{i+1} \\ + \bar{H}_i \cdot H_{i+1}^* \cdot G_{i+2} \\ \vdots \\ + \bar{H}_i \cdot H_{i+1}^* \cdot H_{i+2}^* \cdot \ldots \cdot H_{i+j-1}^* \cdot G_{i+j} \\ + H_i \cdot \bar{P}_{i+1} \\ + H_i \cdot H_{i+1}^{} \cdot \bar{P}_{i+2} \\ \vdots \\ + H_i \cdot H_{i+1}^{} \cdot H_{i+2}^{} \cdot \ldots \cdot H_{i+j-1}^{} \cdot \bar{P}_{i+j} \\ + H_i \cdot H_{i+1} \cdot \ldots \cdot H_{i+j} + C_{i+j+1} \end{bmatrix} \cdot \begin{bmatrix} \bar{H}_i \cdot G_{i+1} \\ + \bar{H}_i \cdot H_{i+1}^* \cdot G_{i+2} \\ \vdots \\ + \bar{H}_i \cdot H_{i+1}^* \cdot H_{i+2}^* \cdot \ldots \cdot H_{i+j-1}^* \cdot G_{i+j} \\ + H_i \cdot \bar{P}_{i+1} \\ + H_i \cdot H_{i+1}^{} \cdot \bar{P}_{i+2} \\ \vdots \\ + H_i \cdot H_{i+1}^{} \cdot H_{i+2}^{} \cdot \ldots \cdot H_{i+j-1}^{} \cdot \bar{P}_{i+j} \\ + \bar{H}_i \cdot H_{i+1} \cdot \ldots \cdot H_{i+j} + \bar{C}_{i+j+1} \end{bmatrix}$$

Where * indicates that an equivalent order P term may be substituted for the indicated H term and
Where ** indicates that an equivalent order $\bar{G}$ term may be substituted for the indicated H term.

A similar expression for $\bar{S}_i$ can be derived to yield equation (9).

$$\bar{S}_i = H_i \cdot C_{i+1} + \bar{H}_i \cdot \bar{C}_{i+1}$$

$$= H_i \cdot G_{i+1}^{i+j}$$

$$+ H_i \cdot H_{i+1}^{i+j} \cdot C_{i+j+1}$$

$$= H_i \cdot G_{i+1}^{i+j}$$

$$+ \bar{H}_i \cdot (\overline{G_{i+1}^{i+j} \cdot H_{i+1}^{i+j}})$$

$$+ H_i \cdot H_{i+1}^{i+j}$$

$$+ \bar{C}_{i+j+1}$$

$$+ \bar{H}_i \cdot (\overline{G_{i+1}^{i+j} \cdot \bar{H}_{i+1}^{i+j}})$$

$$+ \bar{H}_i \cdot H_{i+1}^{i+j} \cdot \bar{C}_{i+j+1}$$

$$H_i \cdot G_{i+1}^{i+j}$$

$$+ \bar{H}_i \cdot (\overline{G_{i+1}^{i+j} \cdot \bar{H}_{i+1}^{i+j}})$$

$$+ \bar{H}_i \cdot H_{i+1}^{i+j}$$

$$+ C_{i+j+1}$$

Note that some of the product terms in equation (9), $H_i \cdot G_{i+1}$, etc. are common with some of the product terms of equation (3). Similarly for equations (8) and (4). This means that the sum and one of the carries of the same bit position share some product terms.

$$= \left\{ \begin{array}{l} H_i \cdot G_{i+1} \\ + H_i \cdot H_{i+1}^* \cdot G_{i+2} \\ \vdots \\ + H_i \cdot H_{i+1}^* \cdot H_{i+2}^* \cdot \ldots \cdot H_{i+j-1}^* \cdot G_{i+j} \\ \bar{H}_i \cdot \bar{P}_{i+1} \\ + \bar{H}_i \cdot H_{i+1}^{} \cdot \bar{P}_{i+2} \\ \vdots \\ + \bar{H}_i \cdot H_{i+1}^{} \cdot H_{i+2}^{} \cdot \ldots \cdot H_{i+j-1}^{} \cdot \bar{P}_{i+j} \\ + H_i \cdot H_{i+1} \cdot \ldots \cdot H_{i+j} + \bar{C}_{i+j+1} \end{array} \right\} \cdot \left\{ \begin{array}{l} H_i \cdot G_{i+1} \\ + H_i \cdot H_{i+1}^* \cdot G_{i+2} \\ \vdots \\ + H_i \cdot H_{i+1}^* \cdot H_{i+2}^* \cdot \ldots \cdot H_{i+j-1}^* \cdot G_{i+j} \\ + \bar{H}_i \cdot \bar{P}_{i+1} \\ + \bar{H}_i \cdot H_{i+1}^{} \cdot \bar{P}_{i+2} \\ \vdots \\ + \bar{H}_i \cdot H_{i+1}^{} \cdot H_{i+2}^{} \cdot \ldots \cdot H_{i+j-1}^{} \cdot \bar{P}_{i+j} \\ + \bar{H}_i \cdot H_{i+1} \cdot \ldots \cdot H_{i+j} + C_{i+j+1} \end{array} \right\} \tag{9}$$

Equations (8) and (9) indicate that an intermediate carry can service a string of several succeeding (next higher-order) sum bits.

Three types of strings are identified:

1. Low-Order String:

The sum bits are generated as ORs or product terms, as in equations (10) and (11) for the low-order bit and equations (12) and (13) for a higher-order bit. The output latch for a sum bit needs but a single input. If an ANDing latch is included for uniformity, as in FIG. 2, the two OR array outputs to be ANDed are generated identically. Product terms are also generated to represent both polarities of the carry out of the string, according to equations (3) and (4), to be used to generate the succeeding string of sum bits. Note that product terms can be shared between the positive high-order sum bit $S_i$ and the negative output carry $\overline{C_i}$ of the string, equations (12) and (4), to require only one additional product term for $\overline{C_i}$. Similar sharing is possible between $\overline{S_i}$ and $C_i$, equations (13) and (3).

$$S_{n-1} = \underline{H}_{n-1} \cdot \overline{C}_{in} + \overline{H}_{n-1} \cdot C_{in} \quad (10)$$
$$\overline{S}_{n-1} = \underline{H}_{n-1} \cdot C_{in} + H_{n-1} \cdot C_{in} \quad (11)$$
$$S_i = H_i \cdot P_{i+1}$$
$$+ H_i \cdot H^{**}_{i+1} \cdot \overline{P}_{i+2}$$
$$\vdots$$
$$+ H_i H^{}_{i+1} \cdot H^{}_{i+2} \cdot \ldots \cdot \overline{P}_{n-1}$$

$$+ H_i \cdot H^{}_{i+1} \cdot H^{}_{i+2} \cdot \ldots \cdot H^{**}_{n-1} \cdot \overline{C}_{in} \quad (12)$$
$$+ \overline{H}_i \cdot G_{i+1}$$

$$+ \overline{H}_i \cdot H^{*}_{i+1} \cdot G_{i+2}$$
$$\vdots$$
$$+ \overline{H}_i \cdot H^{*}_{i+1} \cdot H^{*}_{i+2} \cdot \ldots \cdot G_{n-1}$$
$$+ \overline{H}_i \cdot H^{*}_{i+1} \cdot H^{*}_{i+2} \cdot \ldots \cdot H^{*}_{n-1} \cdot C_{in}$$

$$\overline{S}_i = \overline{H}_i \cdot \overline{P}_{i+1}$$
$$+ \overline{H}_i \cdot H^{**}_{i+1} \cdot \overline{P}_{i+2}$$
$$\vdots$$
$$+ \overline{\phantom{H}}$$

$$H_i \cdot H^{}_{i+1} \cdot H^{}_{i+2} \cdot \ldots \cdot \overline{P}_{n-1}$$
$$+ \overline{H}_i \cdot H^{}_{i+1} \cdot H^{}_{i+2} \cdot \ldots \cdot H^{*}_{n-1} \cdot \overline{C}_{in} \quad (13)$$
$$+ H_i \cdot G_{i+1}$$
$$+ H_i \cdot H^{*}_{i+1} \cdot G_{i+2}$$
$$\vdots$$
$$+ H_i \cdot H^{*}_{i+1} \cdot H^{*}_{i+2} \cdot \ldots \cdot G_{n-1}$$
$$+ H_i \cdot H^{*}_{i+1} \cdot H^{*}_{i+2} \cdot \ldots \cdot H^{*}_{n-1} \cdot C_{in}$$

2. Intermediate Strings:

Each sum bit is generated according to equation (8) or (9), making use of the carries generated out of the immediately preceding (lower-order) string. Product terms are again generated to represent both polarities of the carry out of each string, according to equations (3) and (4), to be used to generate the succeeding string of sum bits.

3. High-Order String:

Each sum bit is generated according to equation (8) or (9), making use of the carries generated out of the immediately preceding (lower-order) string. One polarity of the output carry of the string is generated, being equivalent to the output carry of the adder, Cout. Cout is generated as a function of the next lower-order intermediate carry $C_{q+1}$ according to equation (14) or (15).

$$C_{out} = G^q_o + H^q_o \cdot C_{q+1} \quad (14)$$
$$= (G^q_o + H^q_o) \cdot (G^q_o + C_{q+1})$$
$$= \begin{bmatrix} G_o \\ + H_o \cdot G_1 \\ \vdots \\ + H_o \cdot H^*_1 \cdot \ldots \cdot H^*_{q-1} \cdot G_q \\ + H_o \cdot H_1 \cdot \ldots \cdot H_{q-1} \cdot H_q \end{bmatrix} \cdot \begin{bmatrix} G_o \\ + H_o \cdot G_1 \\ \vdots \\ + H_o \cdot H^*_1 \cdot \ldots \cdot H^*_{q-1} \cdot G_q \\ + C_{q+1} \end{bmatrix}$$

The $H_o$ terms will be shared with high order sum bits and therefore substitution for $H_o$ terms will not prove to be advantageous.

$$\overline{C_{out}} = (\overline{G^q_o} \cdot \overline{H^q_o}) + H^q_o \cdot \overline{C}_{q+1} \quad (15)$$
$$= (\overline{G^q_o} \cdot \overline{H^q_o}) + H^q_o \overline{G^q_o} \cdot \overline{H^q_o} + \overline{C}_{q+1}$$
$$= \begin{bmatrix} \overline{P_o} \\ + H_o \cdot \overline{P_1} \\ \vdots \\ + H_o \cdot H^{}_1 \cdot \ldots \cdot H^{}_{q-1} \cdot \overline{P_q} \\ + H_o \cdot H_1 \cdot \ldots \cdot H_{q-1} \cdot H_q \end{bmatrix} \cdot \begin{bmatrix} \overline{P_o} \\ + H_o \cdot \overline{P_1} \\ \vdots \\ + H_o H^{}_1 \cdot \ldots \cdot H^{}_{q-1} \cdot \overline{P_q} \\ + \overline{C}_{q+1} \end{bmatrix}$$

The product terms for $C_{q+1}$ or $\overline{C}_{q+1}$ are already available from the preceding string. Of the remaining unique product terms of Cout, all but two, $G_o$ and $H_o \cdot \ldots \cdot H_q$, are common with some of the product terms of $\overline{S}_o$ generated according to equation (9). Therefore, Cout needs only two additional product terms over those required for the sum bits. Similarly, if the high-order string of sum bits is positive, implemented according to equation (8), the negative output carry Cout needs but two additional product terms, $\overline{P_o}$ and $H_o \cdot \ldots \cdot H_q$.

The number of product terms can be further reduced through additional product sharing as follows:

1. The product term $(H_i \cdot \ldots \cdot H_{i+j})$ in equation (8) or (9) for a sum bit $S_i$ or $\overline{S}_i$ can be replaced by the OR of the two product terms $(\overline{H}_{i-1} \cdot H_i \cdot \ldots \cdot H_{i+j})$ and $(H_{i-1} \cdot \ldots \cdot H_{i+j})$ of the next higher sum bit $S_{i-1}$ or $\overline{S}_{i-1}$ in the same string. In turn, the product term $(H_{i-1} \cdot \ldots \cdot H_{i+j})$ can be replaced by the OR of the two product terms $(\overline{H}_{i-2} \cdot H_{i-1} \cdot \ldots \cdot H_{i+j})$ and $(H_{i-2} \cdot \ldots \cdot H_{i+j})$ of the sum bit $S_{i-2}$ or $\overline{S}_{i-2}$ in the same string. The replacement can be continued in this fashion through the two product terms $(\overline{H}_{i-w} \cdot H_{i-w+1} \cdot \ldots \cdot H_{i+j})$ and $(H_{i-w} \cdot \ldots \cdot H_{i+j})$ of the highest order sum bit of the string, $S_{i-w}$ or $\overline{S}_{i-w}$.

For a low-order or an intermediate string, the product term $(H_{i-w} \cdot \ldots \cdot H_{i+j})$ can be further replaced by the OR of some of the product terms of the opposite polarity output carry of the same string. For a positive high-order sum bit $S_{i-w}$ of a string, the product term $(H_{i-w} \cdot \ldots \cdot H_{i+j})$ is replaced by:

$$H_{i-w} \cdot \ldots \cdot H_{i+j} \cdot 0 \cdot \overline{P}_{i+j+1}$$
$$+$$
$$\cdot$$
$$\cdot$$
$$+ H_{i-w} \cdot \ldots \cdot H_{i+j} \cdot H_{i+j+1} \cdot \ldots \cdot H_{n-1} \cdot \overline{C}_{in}$$

of the output carry of the string, $\overline{C}_{i-w}$, while for a negative high-order sum bit $\overline{S}_{i-w}$ of a string, it is replaced by:

$$H_{i-w} \cdot \ldots \cdot H_{i+j} \cdot G_{i+j+1}$$
$$+$$
$$\cdot$$
$$\cdot$$
$$+ H_{i-w} \cdot \ldots \cdot H_{i+j} \cdot H_{i+j+1} \cdot \ldots \cdot H_{n-1} \cdot C_{in}$$

of the output carry of the string, $C_{i-w}$.

2. The second highest order sum bit of a low-order string or an intermediate string is selected to be of opposite polarity from the highest order sum bit of the string. This permits additional product term sharing between the two high-order sum bits of the string. For example, a positive high-order sum bit $S_i$ of a low-order string is generated according to equation (12). The product terms $(\overline{H}_i \cdot H_{i+1} \cdot G_{i+2})$ through $(\overline{H}_i \cdot \ldots \cdot C_{in})$ of equation (12), together with the product terms $(H_i \cdot H_{i+1} \cdot \ldots \cdot G_{i+2})$ through $(H_i \cdot \ldots \cdot C_{in})$ of equation (3) representing the output carry $C_i$ of the string, can replace the product terms $(H_{i+1} \cdot G_{i+2})$ through $(H_{i+1} \cdot \ldots \cdot C_{in})$ of the negative second highest order sum bit $S_{i+1}$ of the same string when applying equation (13) to $\overline{S}_{i+1}$. Similarly, a positive high-order sum bit $S_i$ of an intermediate string is generated according to equation (8). The product terms $(\overline{H}_i \cdot H_{i+1} \cdot G_{i+1})$ through $(\overline{H}_i \cdot \ldots \cdot G_{i+j})$ of equation (8), together with the product terms $(H_i \cdot H_{i+1} \cdot G_{i+2})$ through $(H_i \cdot \ldots \cdot G_{i+j})$ of equation (3) representing the output carry $C_i$ of the string, can replace the product terms $(H_{i+1} \cdot G_{i+2})$ through $(H_{i+1} \cdot \ldots \cdot G_{i+j})$ of the negative second highest order sum bit $S_{i+1}$ of the same string when applying equation (9) to $\overline{S}_{i+1}$.

In the same fashion, some of the product terms of a negative high-order sum bit $\overline{S}_i$ beginning with $(\overline{H}_i \cdot H_{i+1} \cdot \ldots \cdot \overline{P}_{i+j})$, together with some of the product terms beginning with $(H_i \cdot \ldots \cdot \overline{P}_{i+j})$ of the output carry $\overline{C}_i$, can replace some of the product terms beginning with $(H_{i+1} \cdot \overline{P}_{i+j})$ of the second highest order sum bit $S_{i+1}$—of a low-order string or an intermediate string.

The number of unique product terms needed for the various strings are derived as follows:

1. Low-Order String:

Using equations (10) and (12) or (11) and (13), the sum bits take 2, 4, 6, etc. product terms for succeeding high-order sum bits. For K sum bits, the number is $K(K+1)$. The output carries of the string take $(K+2)$ using equations (3) and (4) and noting that one of the carries shares all but one product term with the high-order sum bit of the string. Product terms saved due to opposite polarity of the two high-order sum bits are $(K-1)$. Therefore, the total number of product terms needed for a low-order string of H is:

$$T_{low} = K(K+1) + (K+2) - (K-1) = K^2 + K + 3 \quad (16)$$

2. Intermediate String:

Using equations (8) or (9), the sum bits take 2, 4, 6, etc. product terms for succeeding higher-order sum bits. For K sum bits, the number is $K(K+1)$. The output carries of the string take $2(K+L+1)$, less the number shared by one of the output carries with the high-order sum bit, $(K-1)$, for a net of $K+3+2L$, where L is the number of low-order bit positions up to but not including this string. Product terms saved by replacing $(H_i \cdot \ldots \cdot H_{i+j})$ in equations (8) or (9) are K, while those saved due to opposite polarity of the two high-order sum bits are $(K-2)$. Therefore, the total number of product terms needed for an intermediate string of K is:

$$T_i = K(K+1) + (K+3+2L) - K - (K-2) = K^2 + 5 + 2L \quad (17)$$

3. High-Order String:

Using equations (8) or (9), the sum bits take 2, 4, 6, etc. product terms for succeeding high-order sum bits. For K sum bits the number is $K(K+1)$. The output carry of opposite polarity takes but two additional product terms according to equation (14) or (15), noting that some of the product terms are shared with those of the high-order sum bit. Product terms saved by replacing $(H_i \cdot \ldots \cdot H_{i+j})$ in equations (8) or (9) and by sharing between the high order sum bit and the output carry are K. Therefore:

$$T_{high} = K(K+1) + 2 - (K) = K^2 + 3 \quad (18)$$

The next step is to optimize string sizes. The criterion is to normalize the number of unique product terms assigned to a string with respect to the string size, i.e. to divide the number by the string size. For the low-order string, the optimum size is 2. (This follows when $T_{low}$ divided by K is computed for K=1, 2, 3, etc., yielding 5, 4.5, 5, and higher values.) For the intermediate strings, we determine the location of the string expressed in terms of L (the number of lower-order bit positions) where a string of K+1 becomes equally as efficient as a string K. The breakeven value of L is derived as follows:

For string size K+1 to be as efficient as string size K, $$\frac{T_i \text{(size } K\text{)}}{K} = \frac{T_i \text{(size } K + 1\text{)}}{K + 1}$$

-continued $$\frac{K^2 + 5 + 2L}{K} = \frac{(K+1)^2 + 5 + 2L}{K+1}$$

$$K + \frac{5 + 2L}{K} = K + 1 + \frac{5 + 2L}{K+1}$$

$$\frac{5 + 2L}{K} = \frac{(K+1) + 5 + 2L}{K+1}$$

$$5 + 2L = K^2 + K$$

$$L = \frac{K^2 + K - 5}{2}$$

| Transition ($K \rightarrow K+1$) | $2 \rightarrow 3$ | $3 \rightarrow 4$ | $4 \rightarrow 43$ | $5 5 \rightarrow$ | $6 6 \rightarrow$ | $7 7 \rightarrow 8$ |
|---|---|---|---|---|---|---|
| $L_{breakeven}$ | .5 | 3.5 | 7.5 | 12.5 | 18.5 | 25.5 |

It shows that for L=0.5, an intermediate string of size 3 is as efficient as one of size 2. With L=3.5, a string size 4 is as efficient as size 3, etc. We also note that successive breakeven values of L are incremented by successive integers of value K. For example, the transition of string size efficiency from 4 to 5 occurs at a value of L four greater than the transition from 3 to 4, and the transition from 5 to 6 occurs at a value of L five greater than that from 4 to 5, etc. This means that after a low-order string of 2, the optimum string sizes are 3, 4, 5, etc.

We shall now apply the above equations to the design of an 8-bit adder, the schematic of which appears in FIG. 2.

We arbitrarily choose positive strings. The first (low-order) string is two bits long; it includes the functions $S_6$, $\overline{S}_7$, $C_7$, $\overline{C}_7$ which require nine product terms according to equation (16).

The next string is an intermediate string where L is 2. The optimum string size is 3, which requires 18 product terms according to equation (17), producing $S_3$, $\overline{S}_4$, $S_5$, $C_3$ and $\overline{C}_3$.

The last high-order string can only be of size 3 to produce $S_0$, $S_1$, $S_2$ and $\overline{C}_{out}$ and takes eleven new product terms as per equation (18).

In general, if the last string is equal to or one greater than the next-to-last string, the procedure is completed, even if this results in two equal high-order strings. If the last string is one less than the next-to-the-last string, the last string is increased by one while the low-order string is reduced by one to a 1-bit string. If the last string is at least two less than the next-to-last string, the last string is deemed a remainder to be absorbed into one or more preceding strings. Not more than one extra bit to a string is assigned. Priority is given to intermediate strings and then to the low-order string.

The following illustrates the procedure:

| Examples | First Pass String Sizes (Number Indicates String Size) | | | | | Optimum Strings | | | | |
|---|---|---|---|---|---|---|---|---|---|---|
| 1 | 6 | 5 | 4 | 3 | 2 | No Change - | | | | |
| 2 | 5 | 5 | 4 | 3 | 2 | Procedure Complete | | | | |
|   | + |   |   |   | − |   | | | | |
| 3 | 4 | 5 | 4 | 3 | 2 | 5 | 5 | 4 | 3 | 1 |
|   |   | + | + | + |   |   | | | | |
| 4 | 3 | 5 | 4 | 3 | 2 |   | 5 | 5 | 4 | 3 |
|   |   |   | + | + | + |   | | | | |
| 5 | 2 | 5 | 4 | 3 | 2 |   | 5 | 5 | 4 | 2 |
|   |   |   |   | + |   |   | | | | |
| 6 | 1 | 5 | 4 | 3 | 2 |   | 5 | 4 | 4 | 2 |

In examples 3 throught 6 above:
+ marks string increased by one
− marks string decreased by one
/ marks string as a remainder to be absorbed This procedure yields an optimum solution, although for the same number of bit positions, other optima may be possible.

Tables 1, 2 and 3 illustrate the arrangement of strings and the product terms needed for 8, 16 and 32 bit adders respectively according to the invention.

TABLE 1

| 8 BIT ADDER | | | | 38 PRODUCT TERMS | | | | | |
|---|---|---|---|---|---|---|---|---|---|
| BIT POSITION | 0 | 1 | 2 | 3 | 4 | 5 | 6 | 7 | Cin |
| STRING SIZE K |   | 3 |   |   | 3 |   |   | 2 |   |
| LOWER ORDER BIT POSITIONS L |   |   |   |   | 2 |   |   | — |   |
| NO. OF PRODUCT TERMS T |   | 11 |   |   | 18 |   |   | 9 |   |

TABLE 2

| 16 BIT ADDER | | | | | | | 103 PRODUCT TERMS | | | | | | | | | |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 | Cin |
| K |   | 5 |   |   |   |   |   | 5 |   |   |   | 4 |   |   | 2 |   |   |
| L |   |   |   |   |   |   |   | 6 |   |   |   | 2 |   |   | — |   |   |
| T |   | 27 |   |   |   |   |   | 42 |   |   |   | 25 |   |   | 9 |   |   |

TABLE 3

| 32 BIT ADDER | | | | | | | | | | | | | | | 292 PRODUCT TERMS | | | | | | | | | | | | | | | | | |
|---|---|---|---|---|---|---|---|---|---|---|---|---|---|---|---|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | Cin |
| K |   |   |   | 7 |   |   |   |   |   |   |   | 7 |   |   |   |   |   | 6 |   |   |   |   |   | 5 |   |   | 4 |   |   | 3 |   |   |   |
| L |   |   |   | 51 |   |   |   |   |   |   |   | 18 |   |   |   |   |   | 12 |   |   |   |   |   | 7 |   |   | 3 |   |   | — |   |   |   |
| T |   |   |   | 51 |   |   |   |   |   |   |   | 90 |   | 186 |   |   |   | 65 |   |   |   |   |   | 4 |   |   | 27 |   |   | 15 |   |   |   |

Referring again to FIG. 2 and recalling the description of the invention under low order strings and equations (12) and (13) it may be noted that the AND input gate latches 22 for the low order string of sum bits $S_6$ and $\overline{S}_7$ may be replaced with simple latches. This will be made more apparent by noting that connections in the right most columns 20 of OR array 18 are duplicated for each input to the AND input gate latches.

The sharing to product terms of a lock ahead carry among more than one sum bit position is graphically portrayed by noting that carry product terms generated by first and second portions of AND array designated $C_6$ and $\overline{C}_6$ are shared by sum bit positions $S_3$, $\overline{S}_4$, and $S_5$. In order to permit such sharing without interference, product terms of rows 10, 12, 15, 25, 26, 27 are made part of the summation of product terms for sum bit position $S_5$ by way of example.

The sharing of product terms by the high order sum bit of a string of sum bits and the carry out from the string is shown graphically at rows 6, 8, 9, 35, 36, 37, 38, as well as at other rows for the intermediate string.

The sharing of product terms by a low order string or an intermediate order string may be improved by selecting the polarity of the two highest order sum bits of the string to be of opposite polarity as described earlier. This improvement is shown graphically in FIG. 2 at row 3.

From the description of the preferred embodiment of the invention one skilled in the art will recognize a variety of applications for the invention and appropriate modifications within the scope of the claims. An example of such modification is the selective substitution of P terms for H* terms and $\bar{G}$ terms for H** terms described earlier.

What is claimed is:

1. In a carry look ahead adder for the addition of two multi digit numbers $A_0, A_1 \ldots A_{n-1}$ and $B_0, B_1 \ldots B_{n-1}$ with an input carry digit $C_{in}$ to generate a multi digit binary sum $S_0, S_1, S_2 \ldots S_{n-1}$ and a carry out digit $C_{out}$ using programmable logic arrays each with a plurality of two bit input decoders feeding signals to a product term generating array which in turn feeds signals to a sum of product term generating array that supplies signals to AND circuits providing an AND function of two inputs, the improvement comprising:

means feeding like order digits $A_i$, $B_i$ of the two multi digit numbers to the same two bit input decoder; and circuit means in the product term and sum of product term generating arrays providing inputs to one of said AND circuits to generate a sum digit $S_i$ as the output of said one of the AND circuits in accordance with;

$$S_i = \begin{bmatrix} \bar{H}_i \cdot G_{i+1} \\ + \bar{H}_i \cdot H^*_{i+1} \cdot G_{i+2} \\ \cdot \\ \cdot \\ + \bar{H}_i \cdot H^*_{i+1} \cdot H^*_{i+2} \cdot \ldots \cdot H^*_{i+j-1} \cdot G_{i+j} \\ + H_i \cdot \bar{P}_{i+1} \\ + H_i \cdot H^{}_{i+1} \cdot \bar{P}_{i+2} \\ \cdot \\ \cdot \\ + H_i \cdot H^{}_{i+1} \cdot H^{}_{i+2} \cdot \ldots \cdot H^{}_{i+j-1} \cdot \bar{P}_{i+j} \\ + H_i \cdot H_{i+1} \cdot \ldots \cdot H_{i+j} + C_{i+j+1} \end{bmatrix}$$

$$\begin{bmatrix} \bar{H}_i \cdot G_{i+1} \\ + \bar{H}_{i+1} \cdot H^*_{i+1} \cdot G_{i+2} \\ \cdot \\ \cdot \\ + \bar{H}_i \cdot H^*_{i+1} \cdot H^*_{i+2} \cdot \ldots \cdot H^*_{i+j-1} \cdot G_{i+j} \\ + H_i \cdot \bar{P}_{i+1} \\ + H_i \cdot H^{}_{i+1} \cdot \bar{P}_{i+2} \\ \cdot \\ \cdot \\ + H_i \cdot H^{}_{i+1} \cdot H^{}_{i+2} \cdot \ldots \cdot H^{}_{i+j-1} \cdot \bar{P}_{i+j} \\ + \bar{H}_i \cdot H_{i+1} \cdot \ldots \cdot H_{i+j} + \bar{C}_{i+j+1} \end{bmatrix}$$

and alternatively:

$$\bar{S}_i = \begin{bmatrix} H_i \cdot G_{i+1} \\ + H_i \cdot H^*_{i+1} \cdot G_{i+2} \\ \cdot \\ \cdot \\ + H_i \cdot H^*_{i+1} \cdot H^*_{i+2} \cdot \ldots \cdot H^*_{i+j-1} \cdot G_{i+j} \\ + \bar{H}_i \cdot \bar{P}_{i+1} \\ + \bar{H}_i \cdot H^{}_{i+1} \cdot \bar{P}_{i+2} \\ \cdot \\ \cdot \\ + \bar{H}_i \cdot H^{}_{i+1} \cdot H^{}_{i+2} \cdot \ldots \cdot H^{}_{i+j-1} \cdot \bar{P}_{i+j} \\ + H_i \cdot H_{i+1} \cdot \ldots \cdot H_{i+j} + C_{i+j+1} \end{bmatrix}$$

$$\begin{bmatrix} H_i \cdot G_{i+1} \\ + H_i \cdot H^*_{i+1} \cdot G_{i+2} \\ \cdot \\ \cdot \\ + H_i \cdot H^*_{i+1} \cdot H^*_{i+2} \cdot \ldots \cdot H^*_{i+j-1} \cdot G_{i+j} \\ + \bar{H}_i \cdot \bar{P}_{i+1} \\ + \bar{H}_i \cdot H^{}_{i+1} \cdot \bar{P}_{i+2} \\ \cdot \\ \cdot \\ + \bar{H}_i \cdot H^{}_{i+1} \cdot H^{}_{i+2} \cdot \ldots \cdot H^{}_{i+j-1} \cdot \bar{P}_{i+j} \\ + \bar{H}_i \cdot H_{i+1} \cdot \ldots \cdot H_{i+j} + C_{i+j+1} \end{bmatrix}$$

where:

High to low order is from 0 to n−1
$G_i = A_i \cdot B_i$
$\bar{P}_i = \bar{A}_i \cdot \bar{B}_i$
$H_i = A_i \vee B_i$
$[H_i] \bar{H}_i = \overline{A_i \vee B_i} = \bar{A}_i \vee B_i = A \vee \bar{B}_i$
i = a bit position of the sum
j = a bit position of any order lower than i
$C_{i+j+1}$ = the carry out from bit position i+j+1 into bit position i+j

* = substitution of an equivalent order P term for the indicated H term may be advantageous,
** = substitution of an equivalent order $\bar{G}$ term for the indicated H term may be advantageous.

2. The carry lookahead adder of claim 1 wherein the low order sum digits are generated in accordance with:

$$S_i = H_i \cdot \bar{P}_{i+1}$$
$$+ H_i \cdot H^{**}_{i+1} \cdot \bar{P}_{i+2}$$
$$\vdots$$
$$+ H_i \cdot H^{}_{i+1} \cdot H^{}_{i+2} \cdot \ldots \cdot \bar{P}_{n-1}$$
$$+ H_i \cdot H^{}_{i+1} \cdot H^{}_{i+2} \cdot \ldots \cdot H^{**}_{n-1} \cdot \bar{C}_{in}$$
$$+ \bar{H}_i \cdot G_{i+1}$$
$$+ \bar{H}_i \cdot H^*_{i+1} \cdot G_{ilNAREA}$$

2

$$\vdots$$
$$+ \bar{H}_i \cdot H^*_{i+1} \cdot H^*_{i+2} \cdot \ldots \cdot G_{n-1}$$
$$+ \bar{H}_i \cdot H^*_{i+1} \cdot H^*_{i+2} \cdot \ldots \cdot H^*_{n-1} \cdot C_{in}$$

and alternatively:

$$\bar{S}_i = \bar{H}_i \cdot \bar{P}_{i+1}$$
$$+ \bar{H}_i \cdot H^{**}_{i+1} \cdot \bar{P}_{i+2}$$
$$\vdots$$
$$+ \bar{H}_i \cdot H^{}_{i+1} \cdot H^{}_{i+2} \cdot \ldots \cdot \bar{P}_{n-1}$$
$$+ \bar{H}_i \cdot H^{}_{i+1} \cdot H^{}_{i+2} \cdot \ldots \cdot H^{**}_{n-1} \cdot \bar{C}_{in}$$
$$+ H_i \cdot G_{i+1}$$
$$+ H_i \cdot H^*_{i+1} \cdot G_{i+2}$$
$$\vdots$$
$$+ H_i \cdot H^*_{i+1} \cdot H^*_{i+2} \cdot \ldots \cdot G_{n-1}$$
$$+ H_i \cdot H^*_{i+1} \cdot H^*_{i+2} \cdot \ldots \cdot H^*_{n-1} \cdot C_{in}$$

3. The carry look ahead adder of claim 2 wherein the lowest order bit of the low order sum digits is generated in accordance with:

$$S_{n-1} = H_{n-1} \cdot \overline{C}_{in} + \overline{H}_{n-1} \cdot C_{in}$$

and alternatively:

$$\overline{S}_{n-1} = \overline{H}_{n-1} \cdot \overline{C}_{in} + H_{n-1} \cdot C_{in}.$$

4. The adder of claim 1 where any intermediate carry is generated according to:

$$\begin{aligned}
C_i =\ & G_i \\
& + H_i^* \cdot G_{i+1} \\
& \vdots \\
& + H_i^* \cdot H_{i+1}^* \cdot \ldots \cdot H_{n-2}^* \cdot G_{n-1} \\
& + H_i^* \cdot H_{i+1}^* \cdot \ldots \cdot H_{n-2}^* \cdot H_{n-1}^* \cdot C_{in}
\end{aligned}$$

and $$\begin{aligned}
\overline{C}_i =\ & \overline{P}_i \\
& + H_i^{**} \cdot \overline{P}_{i+1} \\
& \vdots \\
& + H_i^{} \cdot H_{i+1}^{} \cdot \ldots \cdot H_{n-2}^{**} \cdot \overline{P}_{n-1} \\
& + H_i^{} \cdot H_{i+1}^{} \cdot \ldots \cdot H_{n-2}^{} \cdot H_{n-1}^{} \cdot \overline{C}_{in}
\end{aligned}$$

5. The adder of claim 4 where the output carry is generated according to:

$$C_{out} = \begin{bmatrix} G_0 \\ +H_o \cdot G_1 \\ \vdots \\ +H_o \cdot H_1^* \cdot \ldots \cdot H_{q-1}^* \cdot G_q \\ +H_o \cdot H_1 \cdot \ldots \cdot H_{q-1} \cdot H_q \end{bmatrix} \begin{bmatrix} G_o \\ +H_o \cdot G_1 \\ \vdots \\ +H_o \cdot H_1^* \cdot \ldots \cdot H_{q-1}^* \cdot G_q \\ +C_{q+1} \end{bmatrix}$$

where $q$ = the highest order bit position for which an input carry $C_{q+1}$ is available.

6. The adder of claim 4 where the complement of the output carry is generated according to:

$$C_{out} = \begin{bmatrix} \overline{P}_o \\ +H_o \cdot \overline{P}_1 \\ \vdots \\ +H_o \cdot H_1^{} \cdot \ldots \cdot H_{q-1}^{} \cdot \overline{P}_q \\ +H_o \cdot H_1 \cdot \ldots \cdot H_{q-1} \cdot H_q \end{bmatrix} \begin{bmatrix} \overline{P}_o \\ +H_o \cdot \overline{P}_1 \\ \vdots \\ +H_o \cdot H_1^{} \cdot \ldots \cdot H_{q-1}^{} \cdot \overline{P}_q \\ +C_{q+1} \end{bmatrix}$$

where $q$ = the highest order bit position for which an input $C_{q+1}$ is available.

7. The adder of claim 4 where the length T of an intermediate string of product terms is $T = K^2 + 5 + 2L$ where L is the number of lower order bits preceding said string and K is the number of bits in said string.

8. In a carry-look ahead adder implemented in a programmed logic array of the type having input bit decoding means, an AND array, an OR array, and AND gates at the inputs to output latches, the improvement comprising:
a first portion of said AND array implementing carry-look ahead terms which are part of the carry-look ahead calculation for at least two sum bit positions;
another portion of said AND array implementing not carry-look ahead terms which are part of the not carry-look ahead calculation for at least two sum bit positions.

9. In a carry-look ahead adder implemented in a programmed logic array of the type having input bit decoding means, an AND array, an OR array, and AND gates at the inputs to output latches, the improvement comprising:
a portion of said AND array implementing product terms which are shared by the high order sum bit of a string of sum bits and the carry out from said string.

10. In a carry-look ahead adder implemented in a programmed logic array of the type having input bit decoding means, an AND array, an OR array, and AND gates at the inputs to output latches, the improvement comprising:
a portion of said AND array implementing product terms which are shared by two high order sum bits of a string, said two high order sum bits being of opposite polarity.

* * * * *